Patented Sept. 26, 1933

1,928,020

UNITED STATES PATENT OFFICE 1,928,020

METHOD OF TREATING PINE OIL FOR THE SEPARATION OF COMPONENTS THEREFROM

Irvin W. Humphrey, Wharton, N. J., assignor to Hercules Powder Company, Wilmington, Del., a corporation of Delaware No Drawing. Application June 12, 1928
Serial No. 284,885

12 Claims. (Cl. 260—153)

My invention relates to a method of treating pine oil for the separation of components therefrom and more particularly for the separation from pine oil of oxygenated compounds as fenchyl alcohol, borneol, methyl chavicol and anethol.

Pine oil contains small proportions of terpenes, large amounts of tertiary alcohols, chiefly alpha-terpineol, certain other oxygenated compounds, as fenchyl alcohol and borneol, which are secondary alcohols, methyl chavicol and anethol, and small amounts of other substances such as ketones, aldehydes, etc. In high grade steam-distilled pine oil the tertiary alcohols will amount to say 50%–75%, the exact content depending partly upon the amount of hydrocarbons present in the pine oil. The hydrocarbons, which boil below about 190° C., make up about 5%–20% of the pine oil and are readily separated in the low boiling portion by efficient fractionation of the pine oil.

Oxygenated compounds, components of the pine oil, as borneol, fenchyl alcohol, methyl chavicol and anethol are minor components and, though desirable and valuable, have heretofore only been separated out in a pure state with difficulty, due to the fact that such components of the pine oil are highly soluble in the liquid tertiary alcohols, components of the pine oil, and especially in the tertiary alcohols of about the same boiling range. These desirable oxygenated components of pine oil, as borneol, fenchyl alcohol, and anethol are, however, much less soluble in the hydrocarbons derived from the tertiary alcohols.

Now in accordance with my invention I so treat pine oil or a pine oil cut, boiling, say, within the range 210° C. to 220° C. or within which the desired components of the pine oil are more or less concentrated, as to effect separation therefrom of alpha-terpineol and then to effect conversion of remaining tertiary alcohols into hydrocarbons, followed by fractionation for the separation of the hydrocarbons from a residual oil containing the oxygenated compounds, borneol, fenchyl alcohol, methyl chavicol and anethol which may be readily recovered from the residual oil.

More particularly according to my invention I subject pine oil, or a pine oil cut boiling within, say, about the range 210° C.–220° C. and obtained by fractionation of pine oil, to treatment with a chemical reagent, as a hydrating agent, for example, dilute sulphuric acid, phosphoric acid, aqueous benzene sulphonic acid, or the like, having the capacity to effect conversion of the alpha-terpineol component of the pine oil into crystalline terpin hydrate, which is separated by filtration, centrifugation, or other convenient method. The oil remaining, which contains the desirable components, as borneol, fenchyl alcohol, methyl chavicol, and anethol, also any nonhydrated alpha terpineol and other tertiary alcohols which may be present, is then neutralized by treatment with an alkali solution, as a solution of soda ash, sodium hydroxide, or the like, and then preferably, but not necessarily, steam distilled. The oil is then subjected to treatment with a chemical dehydrating agent, as iodine, fuller's earth, or the like, which will effect the selective chemical dehydration of the tertiary alcohols remaining in the oil, breaking down or converting the tertiary alcohols into water and terpenes, the latter of which will have a boiling range of about 170° C.–190° C. The desirable components remaining in the oil will be little affected by such treatment. The oil so treated will contain essentially only terpenes, including those originally present in the pine oil and those produced by conversion of the tertiary alcohols, and components of the original pine oil, as borneol, fenchyl alcohol, methyl chavicol, camphor and anethol, all of which, boiling above 195° C., boil above the boiling range, 170° C.–190° C., of the terpenes; hence they may be separated therefrom by fractionation or by fractionation and refrigeration.

After distillation off of the terpenes and water, the fractionation is continued and the several desirable components as borneol, fenchyl alcohol, methyl chavicol and anethol are respectively separated in the form of "cuts" from which several of the respective components may be recovered in a pure state by crystallization promoted by cooling or refrigeration of the cuts.

In the continued distillation of the oil, after distillation off of the terpenes, the fenchyl alcohol will be found to separate from the other components in a cut boiling within about the range 195° C.–205° C.; the borneol will separate in a cut boiling within about the range 205° C.–220° C. and will be found to be concentrated in such cut to an extent requiring care to prevent its solidifying in the condenser; the anethol will separate in a cut boiling within about the range 230° C.–238° C.; and a residue containing polymerized terpenes, etc. may be left.

To obtain the several components of the pine oil, as borneol, fenchyl alcohol, and anethol in a pure state, the several cuts respectively are refrigerated to effect crystallization of the components which enables their ready separation from the mother liquor by filtration, centrifugation, or other method. If desired, an increased yield of the various components may be obtained from the cuts by fractionation of the respective mother liquors after initial crystallization and separation of the crystals followed by crystallization of further quantities of the components from cuts of the respective mother liquors in which the components respectively are concentrated.

As a typical example of the carrying out of the method in accordance with my invention, which, it will be understood, is given merely by way of illustration, say 1000 parts of pine oil are agitated at 60° F. with an equal volume of say 33% sulphuric acid, yielding about 620 parts of crystallized terpin hydrate and about 405 parts of oil. The terpin hydrate is separated from the oil, as for example, by filtration and the oil is then heated with, for example, about 0.2% iodine to effect conversion of tertiary alcohols present into terpene hydrocarbons and water. On distillation of the treated oil, about 25% of terpenes boiling within about the range 170° C.–185° C. will be separated. The higher boiling oil remaining from the above treatment i. e. boiling above about 185° C. will, for example, yield about 42 parts of borneol, in crystalline form, readily separated from the mother liquor by filtration, on cooling to 0° C. The mother liquor may be fractionated, or fractionated and refrigerated, with yield of additional borneol and of fenchyl alcohol, methyl chavicol, anethol and ketones, or the treated oil after distillation off of the terpenes and water may be fractionated, or cut, and the several fractions, or cuts, respectively refrigerated for the separation of fenchyl alcohol, borneol, camphor and anethol as hereinabove described.

It will be understood that while in the claims appended hereto reference is made to pine oil that I intend to include a pine oil fraction or cut as an equivalent of pine oil.

It will be understood that in the carrying out of my invention no unusual form of apparatus is required.

Having now fully described my invention, what I claim and desire to protect by Letters Patent is:

1. The method of treating pine oil for the separation of borneol therefrom which includes subjecting pine oil to the action of a chemical reagent effective to convert alpha-terpineol into crystalline terpin hydrate, separating crystalline terpin hydrate from the oil and subjecting the residual oil to the action of a selective chemical dehydrating agent effective to convert tertiary alcohols therein into terpene hydrocarbons and water without substantial dehydration of secondary alcohols separating terpene hydrocarbons from the treated residual oil and separating borneol from the residual oil.

2. The method of treating pine oil for the separation of oxygenated components thereof which includes subjecting pine oil to treatment with sulphuric acid for conversion of alpha-terpineol into crystalline terpin hydrate, separating crystalline terpin hydrate from the residual oil, treating the residual oil with iodine for the conversion of tertiary alcohols into terpene hydrocarbons and water, separating terpene hydrocarbons and isolating a pine oil oxygenated compound from the residual oil.

3. The method of treating pine oil for the separation of oxygenated components therefrom which includes subjecting pine oil to the action of a chemical reagent effective to convert alpha-terpineol into crystalline terpin hydrate, separating crystalline terpin hydrate from the oil and subjecting the residual oil to the action of iodine to convert tertiary alcohols therein into terpene hydrocarbons and water, separating terpene hydrocarbons from the treated residual oil and isolating a pine oil oxygenated compound from the residual oil.

4. The method of treating pine oil for the separation of oxygenated components therefrom which includes subjecting pine oil to the action of a chemical reagent effective to convert alpha-terpineol present into crystalline terpin hydrate, separating crystalline terpin hydrate from the oil and subjecting the residual oil to the action of a selective chemical dehydrating agent effective to convert tertiary alcohols therein into terpene hydrocarbons and water without substantial dehydration of secondary alcohols separating terpene hydrocarbons from the treated residual oil, fractionating the residual oil into a plurality of fractions and effecting the crystallization of a pine oil oxygenated compound from the fractions respectively.

5. The method of treating pine oil for the separation of components thereof which includes hydrating pine oil for conversion of alpha-terpineol present into crystalline terpin hydrate, separating crystalline terpin hydrate from the oil, treating the residual oil with a selective chemical dehydrating agent for the conversion of tertiary alcohols into terpenes, without substantial dehydration of secondary alcohols separating terpenes and isolating borneol from the residual oil.

6. The method of treating pine oil for the separation of components thereof which includes subjecting pine oil to treatment with sulphuric acid for conversion of alpha-terpineol into crystalline terpin hydrate, separating crystalline terpin hydrate from the residual oil, treating the residual oil with iodine for the conversion of tertiary alcohols into terpenes, separating terpenes and isolating borneol from the residual oil.

7. The steps in the method of treating pine oil for the separation of oxygenated components thereof which include hydrating pine oil with a reagent to effect conversion of alpha-terpineol contained therein into crystallized terpin hydrate and treating the residual oil with a selective chemical dehydrating agent to effect conversion of tertiary alcohols therein into hydrocarbons and water without substantial dehydration of secondary alcohols.

8. The steps in the method of treating pine oil for the separation of oxygenated components thereof which include hydrating pine oil with a reagent to effect conversion of alpha-terpineol contained therein into crystallized terpin hydrate, treating the residual oil with a selective chemical dehydrating agent to effect conversion of tertiary alcohols therein into hydrocarbons and water without substantial dehydration of secondary alcohols, separating terpene hydrocarbons and isolating a pine oil oxygenated compound from the residual oil.

9. The method of treating pine oil for the separation of an oxygenated component thereof which includes hydrating pine oil with a reagent to effect conversion of alpha-terpineol contained therein into crystallized terpin hydrate and treating the residual oil with fuller's earth to effect conversion of tertiary alcohols therein into hydrocarbons and water and isolating an oxygenated compound from the residual oil.

10. The method of treating pine oil for the separation of an oxygenated component therefrom which includes subjecting pine oil to the action of a chemical reagent effective to convert alpha-terpineol into crystallized terpin hydrate, separating the crystallized terpin hydrate from the oil and subjecting the residual oil to the action of a selective chemical dehydrating agent to convert tertiary alcohols therein into terpene hydrocarbons and water without substantial decomposition of secondary alcohols, separating terpene hydrocarbons from the treated residual oil, and separating fenchyl alcohol from the residual oil.

11. The method of treating pine oil for the separation of borneol which includes hydrating pine oil with a reagent to effect conversion of alpha-terpineol contained therein into crystallized terpin hydrate, treating the residual oil with fuller's earth to effect conversion of tertiary alcohols therein into hydrocarbons and water and isolating borneol from the residual oil.

12. The method of treating pine oil for the separation of fenchyl alcohol which includes hydrating pine oil with a reagent to effect conversion of alpha-terpineol contained therein into crystallized terpin hydrate, treating the residual oil with fuller's earth to effect conversion of tertiary alcohols therein into hydrocarbons and water and isolating fenchyl alcohol from the residual oil.

IRVIN W. HUMPHREY.